(12) United States Patent
Lee et al.

(10) Patent No.: US 8,049,678 B2
(45) Date of Patent: Nov. 1, 2011

(54) IMAGE CAPTURING AND DISPLAYING METHOD AND SYSTEM

(75) Inventors: Sang-Hyuck Lee, Seoul (KR); Dong-Jun Weon, Gyeonggi-Do (KR); Jee-Young Cheon, Seoul (KR); Seung-Jun Lee, Seoul (KR); Soo-Jin Jeon, Gyeonggi-Do (KR); Seon-Tae Jo, Gyeonggi-Do (KR); Yeon-Woo Park, Seoul (KR)

(73) Assignee: LG Electronics, Inc., Seoul (KR)

( * ) Notice: Subject to any disclaimer, the term of this patent is extended or adjusted under 35 U.S.C. 154(b) by 1010 days.

(21) Appl. No.: 11/530,421

(22) Filed: Sep. 8, 2006

(65) Prior Publication Data

US 2007/0057866 A1 Mar. 15, 2007

(30) Foreign Application Priority Data

Sep. 9, 2005 (KR) .................. 10-2005-0084129
Sep. 15, 2005 (KR) .................. 10-2005-0086156

(51) Int. Cl.
*G09G 5/00* (2006.01)
(52) U.S. Cl. ............ 345/1.1; 345/1.2; 345/1.3; 345/2.3; 345/2.2; 345/566
(58) Field of Classification Search ............ 345/1.1–2.3; 455/566, 575.1
See application file for complete search history.

(56) References Cited

U.S. PATENT DOCUMENTS

| | | | | |
|---|---|---|---|---|
| 4,746,981 A * | 5/1988 | Nadan et al. | .................. | 348/581 |
| 4,760,388 A * | 7/1988 | Tatsumi et al. | ................. | 345/1.3 |
| 4,761,641 A * | 8/1988 | Schreiber | ........................ | 345/1.3 |
| 4,800,376 A * | 1/1989 | Suga et al. | ...................... | 345/1.3 |
| 5,434,626 A * | 7/1995 | Hayashi et al. | ................ | 348/569 |
| 5,499,036 A * | 3/1996 | Hauck | ............................. | 345/3.1 |
| 6,144,358 A * | 11/2000 | Narayanaswamy et al. | .. | 345/102 |
| 7,161,557 B2 * | 1/2007 | Thornton | ........................ | 345/2.1 |
| 7,196,677 B2 * | 3/2007 | Sato et al. | ....................... | 345/1.3 |
| 7,233,807 B2 * | 6/2007 | Lim | ............................ | 455/556.1 |
| 7,233,907 B2 * | 6/2007 | Young | ........................... | 705/7.22 |
| 7,242,369 B2 * | 7/2007 | Huang | ............................ | 345/1.1 |
| 7,268,747 B2 * | 9/2007 | Taniguchi et al. | ................ | 345/6 |
| 7,348,936 B2 * | 3/2008 | Lee et al. | ........................ | 345/3.1 |
| 7,471,890 B2 * | 12/2008 | Lee et al. | ........................ | 396/287 |
| 7,515,193 B2 * | 4/2009 | Honda | ..................... | 348/333.05 |
| 2003/0052964 A1* | 3/2003 | Priestman et al. | ........... | 348/14.02 |
| 2004/0204144 A1* | 10/2004 | Lim | ............................. | 455/566 |
| 2005/0015723 A1 | 1/2005 | Light et al. | | |
| 2005/0153746 A1* | 7/2005 | Yoon | ............................. | 455/566 |
| 2005/0245288 A1* | 11/2005 | Priestman et al. | ........... | 455/569.1 |
| 2006/0095936 A1* | 5/2006 | Kim | ................................ | 725/39 |
| 2006/0264243 A1* | 11/2006 | Aarras | ........................... | 455/566 |

(Continued)

FOREIGN PATENT DOCUMENTS

CN 1300497 6/2001

(Continued)

*Primary Examiner* — Richard Hjerpe
*Assistant Examiner* — Jeffrey S Steinberg
(74) *Attorney, Agent, or Firm* — Lee, Hong, Degerman, Kang & Waimey

(57) ABSTRACT

In accordance with one aspect of the invention, a mobile communication terminal comprises a first display and a second display and a user interface for allowing a user to select one or more images to be displayed on either of the first and second displays, wherein images displayed on both the first and the second display are viewable from a first viewing angle.

21 Claims, 15 Drawing Sheets

U.S. PATENT DOCUMENTS

2007/0057866 A1 * 3/2007 Lee et al. ................. 345/1.1

FOREIGN PATENT DOCUMENTS

| | | |
|---|---|---|
| CN | 2662553 | 12/2004 |
| EP | 1 241 860 A1 | 9/2002 |
| EP | 1 560 421 A1 | 8/2005 |
| JP | 04-022244 | 1/1992 |
| JP | 04-088527 | 3/1992 |
| JP | 11-27417 | 1/1999 |
| JP | 11-053158 | 2/1999 |
| JP | 1999-053185 | 2/1999 |
| JP | 11-232003 | 8/1999 |
| JP | 2000-253113 | 9/2000 |
| JP | 2002-094629 | 3/2002 |
| JP | 2002-171497 | 6/2002 |
| JP | 2003-132048 | 5/2003 |
| JP | 2003-302957 | 10/2003 |
| JP | 2004-128607 | 4/2004 |
| JP | 2004-180021 | 6/2004 |
| JP | 2004-252773 | 9/2004 |
| JP | 2004-289402 | 10/2004 |
| JP | 2005-115536 | 4/2005 |
| JP | 2005-175653 | 6/2005 |
| JP | 2005-184230 | 7/2005 |

* cited by examiner

IMAGE CAPTURING AND DISPLAYING METHOD AND SYSTEM

CROSS-REFERENCE TO RELATED APPLICATIONS

Pursuant to 35 U.S.C. §119(a), this application claims the benefit of earlier filing date and right of priority to Korean Patent Application No. 10-2005-0084129, filed on Sep. 9, 2005 and Korean Patent Application No. 10-2005-0086156, filed on Sep. 15, 2005, the contents of which is hereby incorporated by reference herein in its entirety.

FIELD OF THE INVENTION

The present invention relates to a mobile terminal capable of simultaneously capturing images of two objects or simultaneously displaying two or more images.

BACKGROUND

Recently, the developments in mobile terminal fabrication techniques and mobile communication technology and the trend of digital convergence have resulted in mobile terminals being combined with various digital devices For example, an MP3 player, a digital camera, a TV receiver, or the like, may be combined in a mobile communication terminal for providing diverse supplementary functions such as video, music, games, banking transactions, image capturing, broadcasting, etc.

In particular, mobile terminals that can provide various display functions are receiving much attention. Accordingly, many mobile terminals on the market today include a camera module to provide a digital camera function, and more advanced mobile terminals include a camera module with performance of about 3 to 7 million pixels which is similar to typical digital cameras.

However, the related art mobile terminals include only a single camera and a single main display unit and provide simple functions similar to a basic digital camera, without taking advantage of other mobile terminals functionality.

SUMMARY

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in accordance with one aspect of the invention, a mobile terminal comprises a transceiver unit for transmitting and receiving signals; first and second camera units for capturing still images and video; first and second display units for displaying images; a storage unit for storing data; and a controller for controlling the mobile terminal such that at least one of an image captured through at least one of the first and second camera units, an image received through the transceiver unit and an image stored in the storage unit is displayed on at least one of the first and second display units.

At least one of the images captured by the first and second camera units, or the received image, or the stored image are displayed on the first display unit, and at least another image is displayed on the second display unit. In one embodiment, at least one of the images captured by the first and second camera units, the received image and the stored image is entirely displayed on one of the first and second display units.

In another embodiment, the image captured by at least one of the first and second camera units is displayed on the first display unit, and the image received through the transceiver is displayed on the second display unit. In certain embodiments, a first image stored in the storage unit is displayed partially on the first display unit and partially on the second display unit. An image stored in the storage unit can be transmitted to a designated subscriber through the transceiver.

An image stored in the storage unit is displayed on the first display unit and an image for performing a function of the mobile terminal is displayed on the second display unit, wherein the second display unit is a touch screen. First and second images stored in the storage unit are displayed together on the first display unit. The first and second images are displayed on a screen of the first display unit divided into a plurality of viewable sections.

In one embodiment, the screen is divided according to a picture-in-picture method, such that the screen is divided into a main screen and at least one sub-screen, wherein an image with higher importance is displayed on the main screen and at least one image is displayed on the at least one sub-screen. In one embodiment, images of the main screen and the sub-screen can be switched. First and second images stored in the storage unit can be combined for display, storage and transmission. Images can be also virtually combined through a preview function.

In accordance with another aspect of the invention, a mobile communication terminal comprises a first display and a second display, wherein images displayed on both the first and the second display are viewable from a first viewing angle; and a user interface for allowing a user to select one or more images to be displayed on either of the first and second displays.

The mobile communication terminal may further comprise at least one camera for capturing at least one of still and moving images; and a storage unit for storing images captured and received by the mobile communication device, such that a first image is displayed on the first display and a second image is displayed on the second display.

In some embodiments, a first potion of a first image can be displayed on the first display and a second portion of the first image can be displayed on the second display. In other embodiments, a first image and a second image are displayed on the first display. The first and second images can be displayed in a picture-in-picture format. The first display can be divided into a main screen and at least one sub-screen, wherein the first image is displayed in the main screen and the second image is displayed in said at least one sub-screen. In a preferred embodiment, the first display comprises a touch screen for allowing a user to interact with the mobile communication terminal.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1:
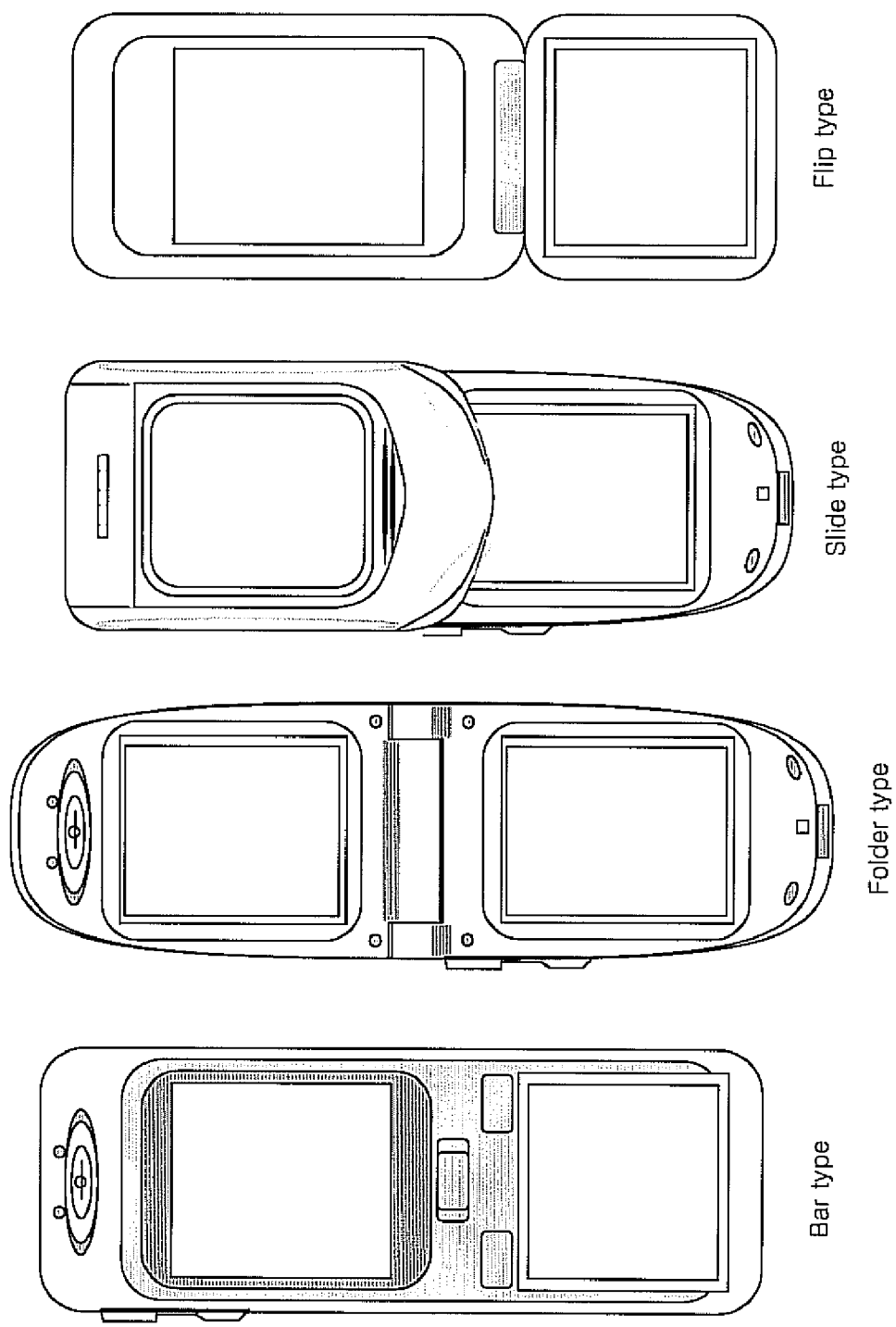
FIG. 1 shows exemplary embodiments of a mobile terminal with multiple display units according to one embodiment.

The present invention can be applied to a mobile terminal (or other digital devices) having two or more cameras and two or more display units. A mobile terminal having dual cameras and dual displays is shown in FIGS. 1 and 2. As shown, any type of mobile terminal, such as a bar type, a folder type or a slide type mobile terminal, can have two display units.

Figure 2A:
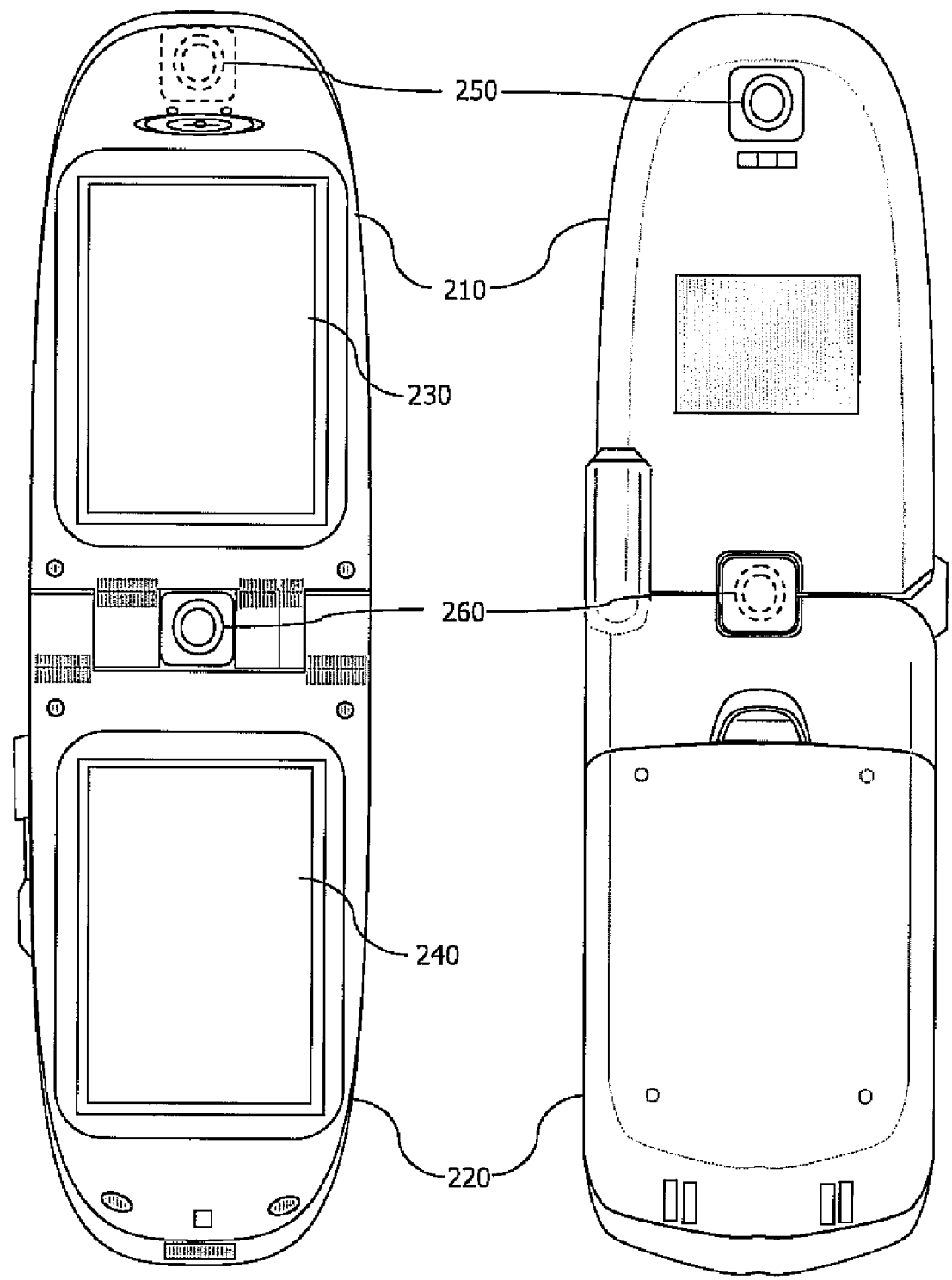
FIGS. 2A and 2B show an exemplary embodiment of a mobile terminal according to another embodiment.
Figure 2B:
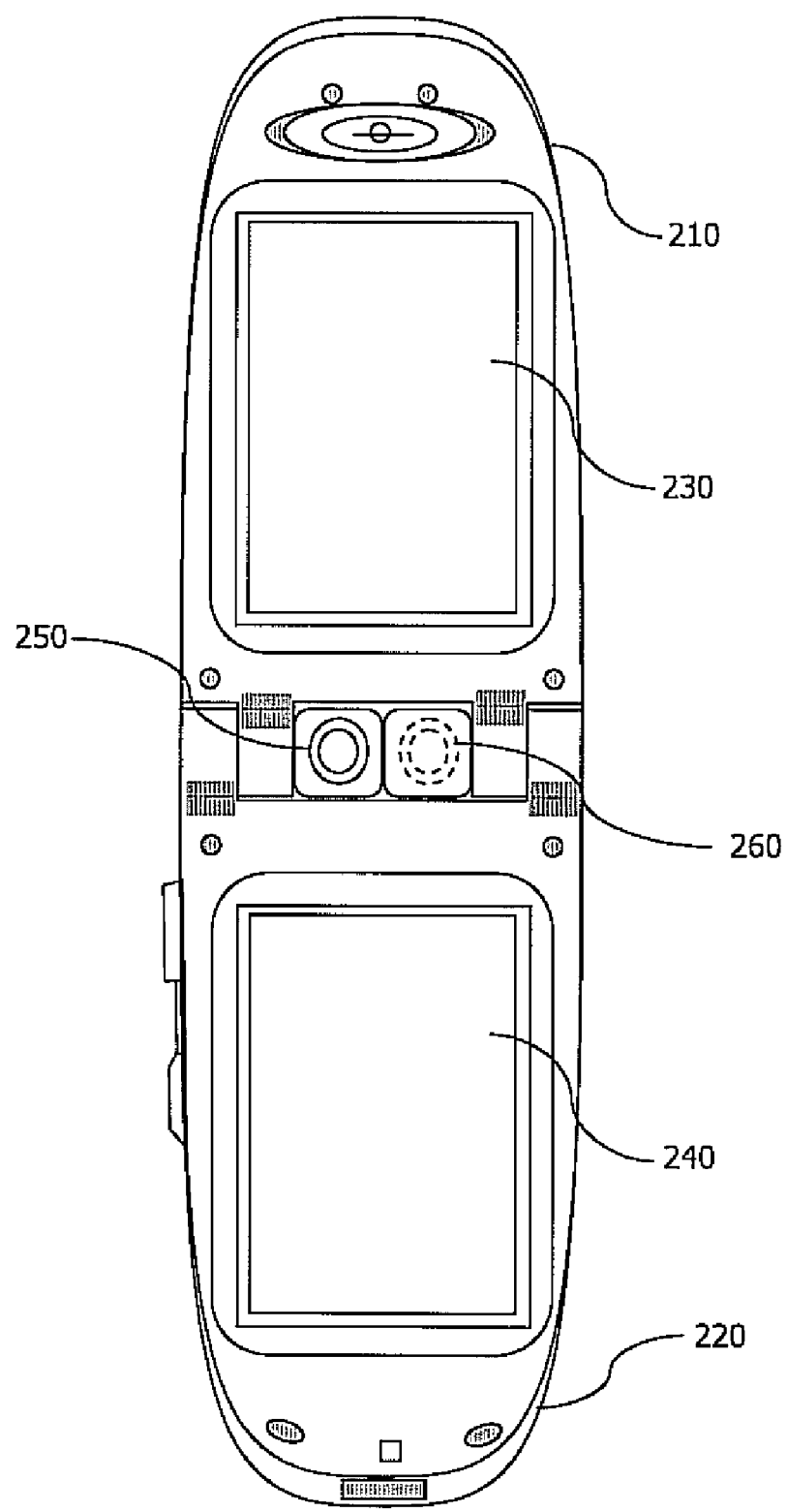

Referring to FIG. 2A, two cameras 250 and 260 can be provided on a rear side of an upper body 210, or at a hinge part that connects the upper body 210 and a lower body 220, respectively. Alternatively, as shown in FIG. 2B, the two cameras 250 and 260 can be provided in a side-by-side manner at the hinge part, for example.

A folder type mobile terminal as shown in FIG. 2A may include display units 230 and 240 provided on the upper body 210 and the lower body 220, respectively. A fixed camera 250 may be provided at the opposite side of the display unit 230 of the upper body 210, and a rotary camera 260 may be provided at the hinge part. A folder type mobile terminal as shown in FIG. 2B may include display units 230 and 240 provided at the upper body 210 and the lower body 220, and two rotary cameras 250 and 260 provided at the hinge part, for example.

Although not shown, two cameras can be provided at upper and lower ends of the upper body 210. For example, a fixed camera can be provided on the rear side of the upper body 210 and a fixed camera can be provided at a lower end of the upper body 210. In one embodiment, a rotary camera can be provided at an upper end of the upper body 210. In another embodiment, the mobile terminal includes display units provided at the lower body 220 as well as the upper body 210 and the two cameras 250 and 260 for capturing images in different directions.

Figure 3:
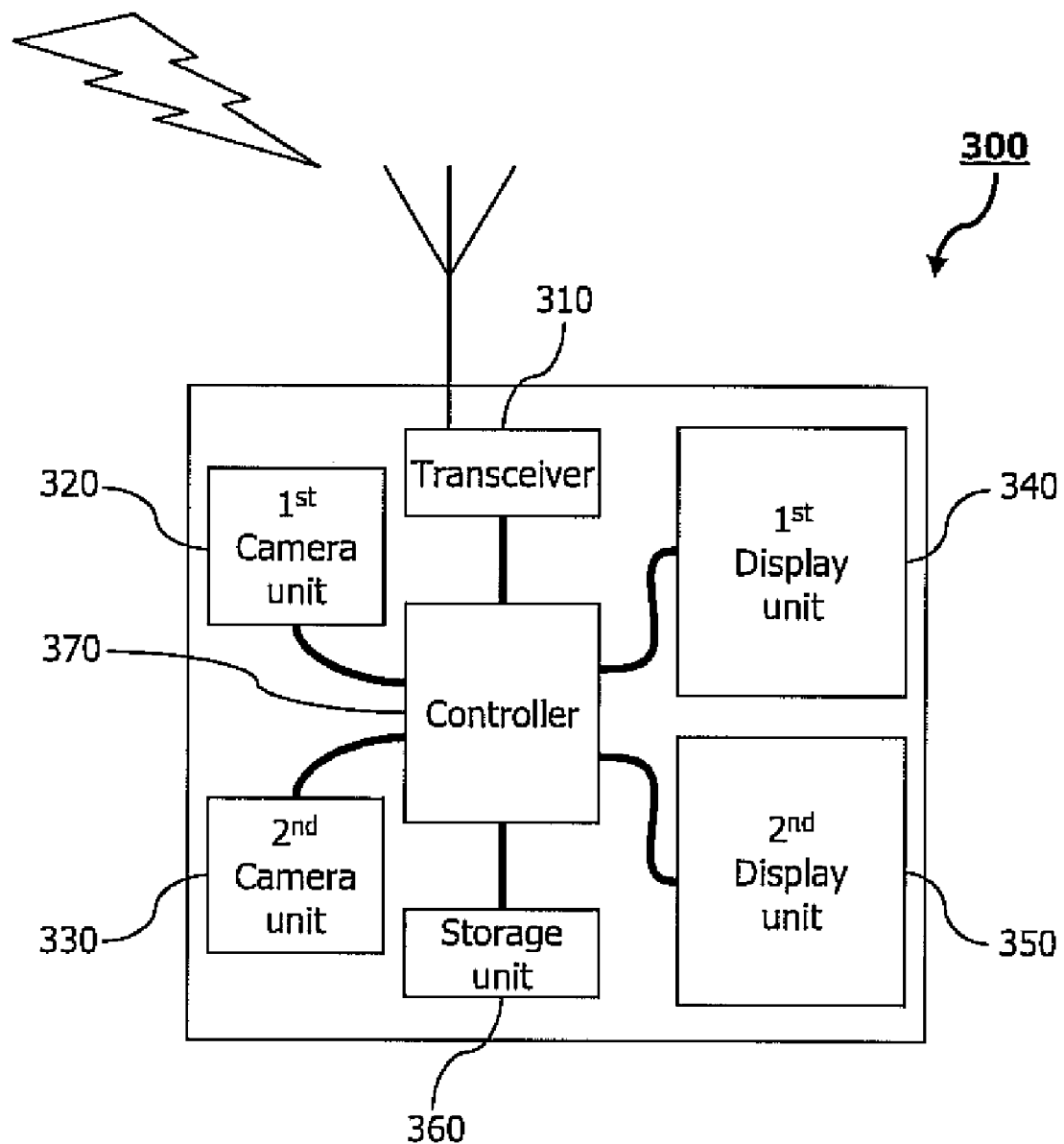
FIG. 3 shows the construction of the mobile terminal according to another exemplary embodiment.

As shown in FIG. 3, the mobile terminal 300 may include a transceiver 310 for transmitting and receiving signals; first and second camera units 320 and 330 for capturing still images and videos; first and second display units 340 and 350 for displaying images; a storage unit 360 for storing data; and a controller 370 for controlling the first and second camera units 320 and 330 and controlling at least one of the first and second display units 340 and 350 to display at least one image captured through at least one of the first and second camera units 320 and 330, an image received through the transceiver; or an image stored in the storage unit 360.

The controller 370 may provide control such that an image captured by the first camera unit 320 is displayed on the first display unit 340 and an image captured by the second camera unit 330 is displayed on the second display unit 350, or may provide control such that the images captured by the first and second camera units 320 and 330 are all displayed on one of the first and second display units 340 or 350.

In another embodiment, the controller 370 may provide control such that the image captured by the first camera unit 320 or the second camera unit 330 or the image received through the transceiver 310 is simultaneously displayed on the first and second display units 340 and 350. So, the same image may be displayed on both display units 340 and 350, respectively, or one image can be divided into two parts and each displayed on one of the two display units 340 or 350.

In one embodiment, the controller 370 may provide control such that the image captured by the first camera unit 320 or the second camera unit 330 is displayed on the first display unit 340, and the image received through the transceiver 310 is displayed on the second display unit 350, for example. Preferably, the controller 370 may provide control such that the image captured by the first camera unit 320 or the second camera unit 330 or an image stored in the storage unit 360 is transmitted to a designated subscriber (user) through the transceiver 310.

In certain embodiments, the controller 370 may provide control such that at least one image captured by the first camera unit 320 or the second camera unit 330 is stored in the storage unit 360 and an image received through the transceiver 310 is displayed on one of the first and second display units 340 or 350, and an image for performing a function of the mobile terminal is displayed on the other display unit.

In a preferred embodiment, the controller 370 may provide control such that two or more images among the images are captured through the first camera unit 320. The images captured through the second camera unit 330, the image stored in the storage unit 360 and the image received through the transceiver 310 can be displayed together on at least one of the first and second display units 340 and 350.

When two or more images are displayed on at least one of the first and second display units 340 and 350, one screen can be divided into multiple parts corresponding to the number of images to be displayed on one screen. For example, the screen can be divided according to a PIP (Picture In Picture) method. The divided screen can have a main screen and at least one sub-screen. Based on an importance of a pre-set image or the user's settings, a relatively more important image can be displayed on the main screen and a relatively less important image can be displayed on the sub-screen. Images on the main screen and the sub-screen can be switched. Thus, an image on the main screen can be displayed on the sub-screen, or an image on the sub-screen can be displayed on the main screen.

The controller 370 may provide control such that two or more images are captured through the first camera unit 320, or through the second camera unit 330. The images captured and stored in the storage unit 360 and the image received through the transceiver 310, for example, may be combined to be displayed, stored or transmitted.

Figure 4:
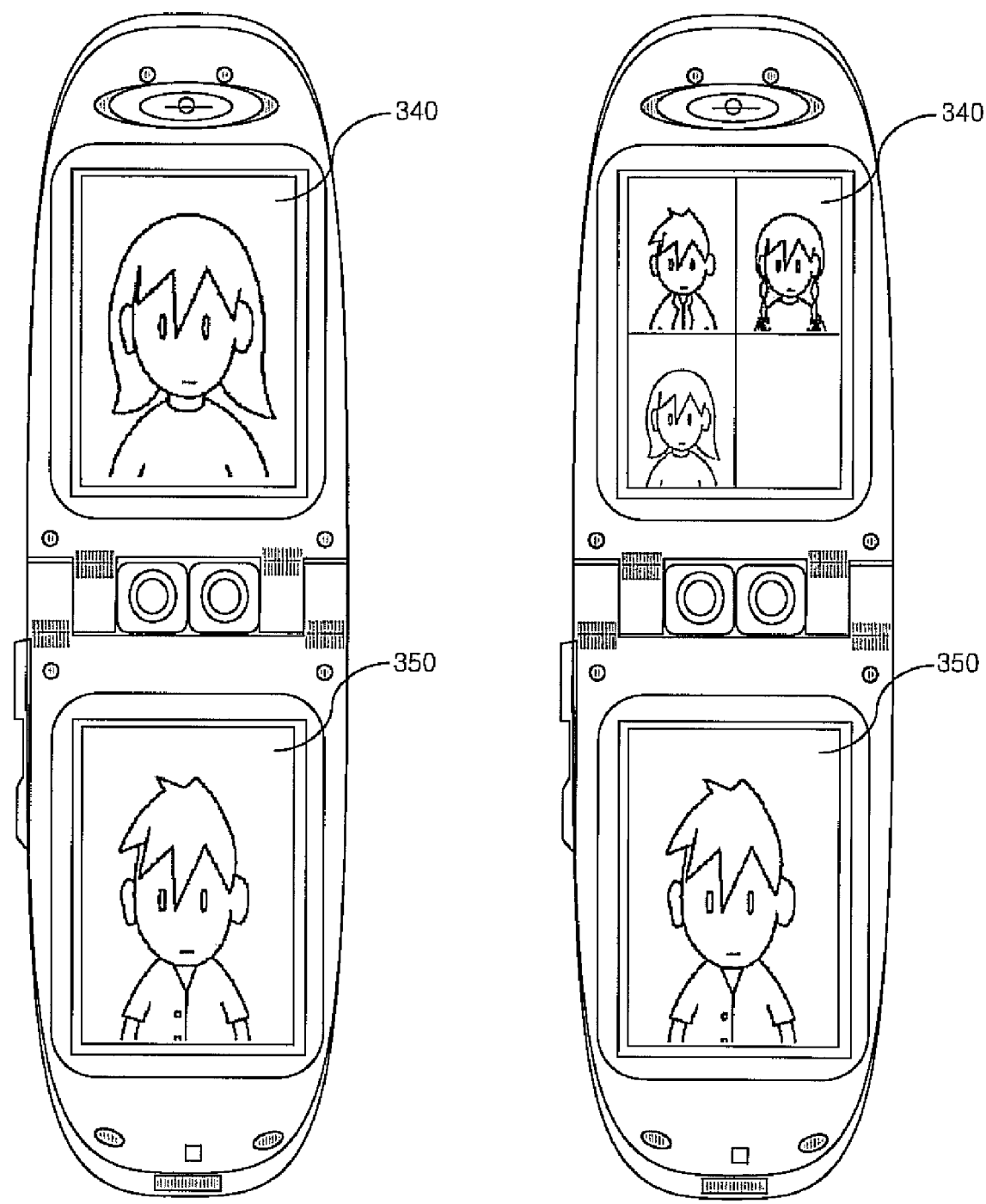
FIGS. 4 to 12 show various embodiments of an image capturing and displaying method of the mobile terminal according to one or more embodiments.

For example, in case of video communications (e.g., video telephony, video conference calls, etc.) as shown in FIG. 4, the controller 370 may provide control such that an image received from the other party is displayed on the first display unit 340, and an image of a user captured by the first camera unit 320 or the second camera unit 330 is displayed on the second display unit 350. Also, images received from three or more people can all be displayed on the first display unit 340 by dividing the screen of the first display unit 340 and the image of the user captured by the first camera unit 320 or the second camera unit 330 can be displayed on the second display unit 350, for example.

Figure 5:
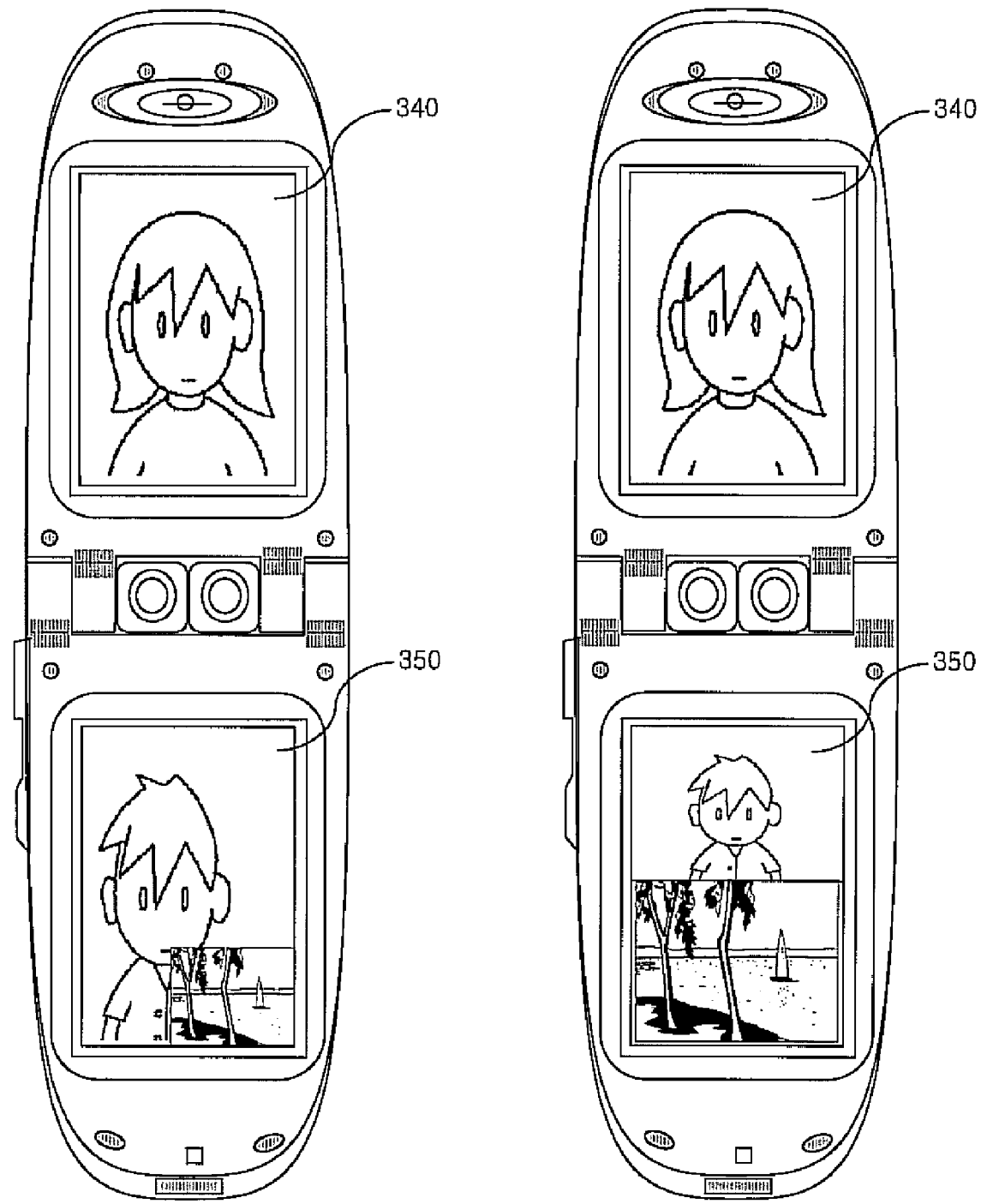

Referring to FIG. 5, the controller 370 may provide control such that the image received from the a third party is displayed on the first display unit 340 and the image captured by the first camera unit 320 and the image captured by the second camera unit 330 are displayed together on the second display unit 350 by dividing the screen, for example.

Figure 6:
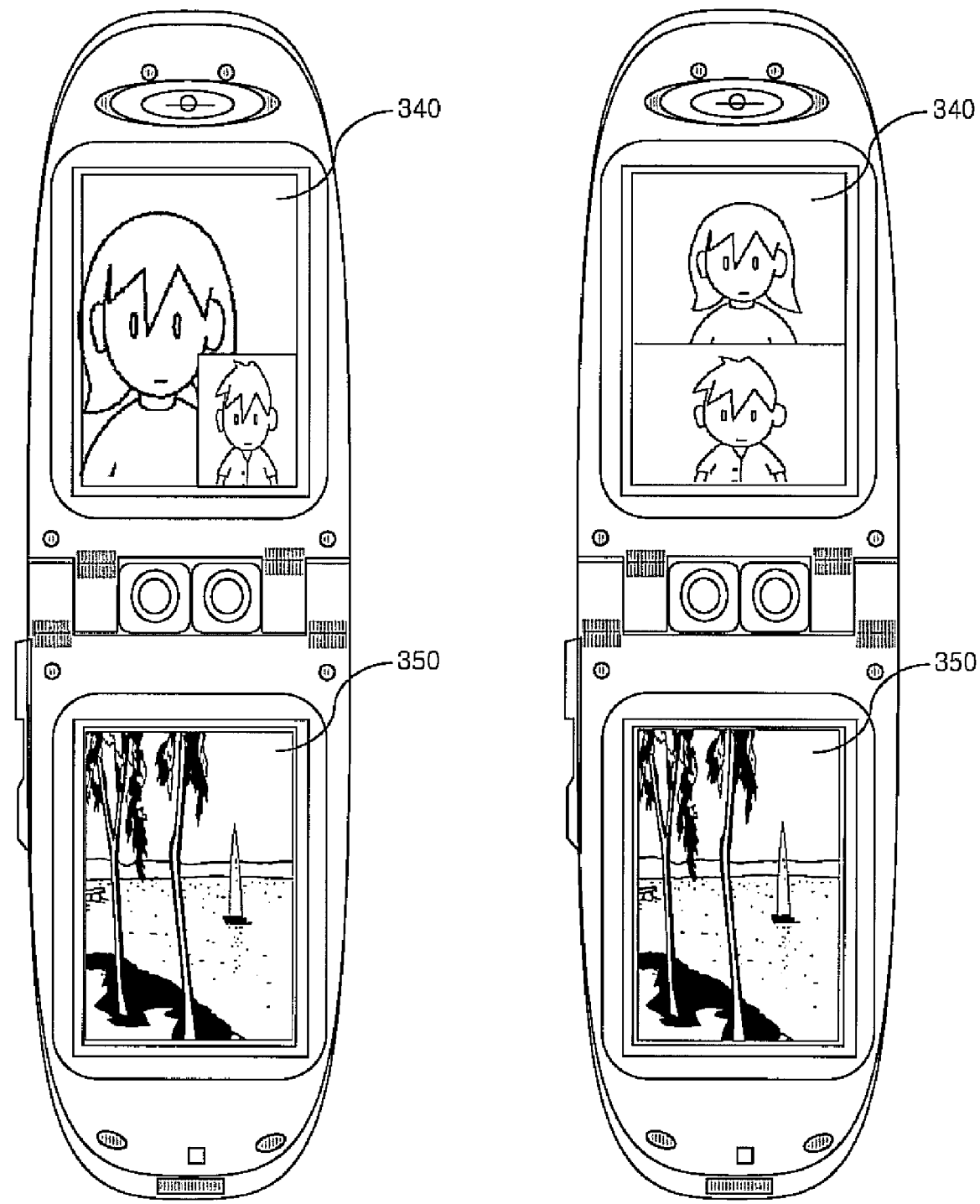

Referring to FIG. 6, the controller 370 may provide control such that the image received from another party and images captured through the first or second camera units 320 and 330 are displayed together on the first display unit 340 by splitting the screen, and another image inputted through the first or second camera units 320 and 330 is displayed on the second display unit 350.

Figure 7:
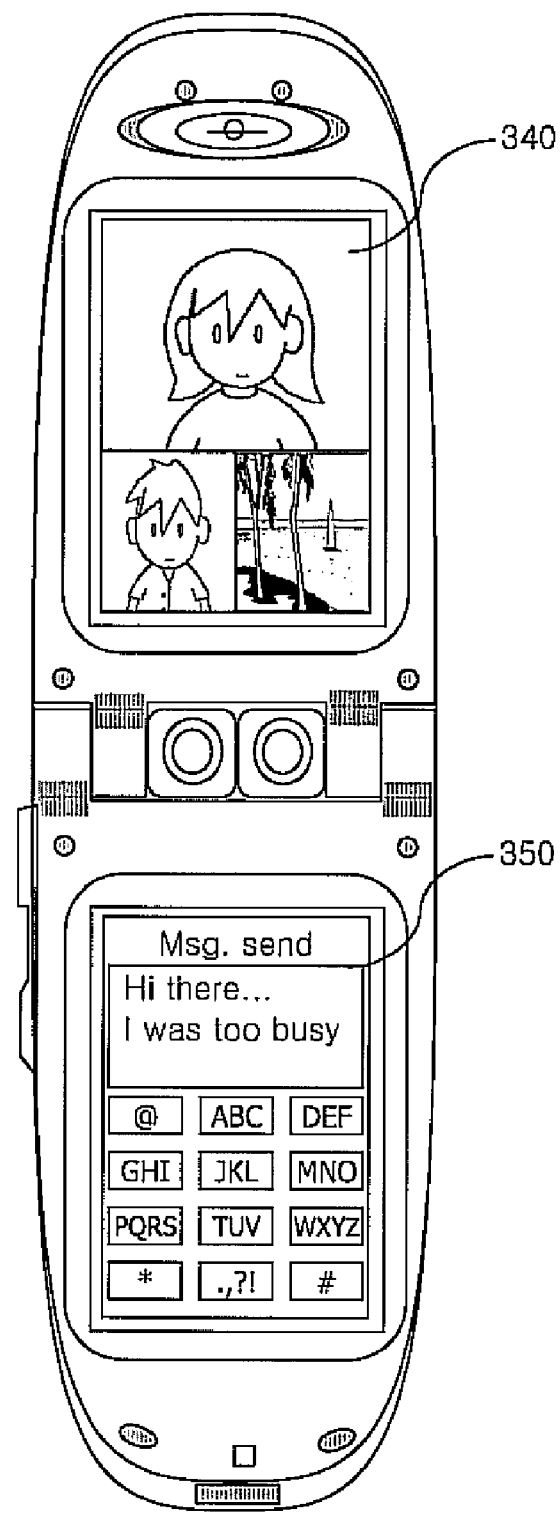

Referring to FIG. 7, the image received from another party or the image captured through the first camera unit 320 or the second camera unit 330 may be displayed on the first display unit 340, while the image for performing a function of the mobile terminal, such as creating a message, can be displayed on the second display unit 350, for example.

In one embodiment, considering the overall design of the mobile terminal or to maximize the size of the display units, a hardware type keypad may be omitted and the second display unit 350, for example, can have a touch sensitive screen to receive user touch inputs. Preferably, both of the first and second display units 340 and 350 can be touch screens.

Figure 8:
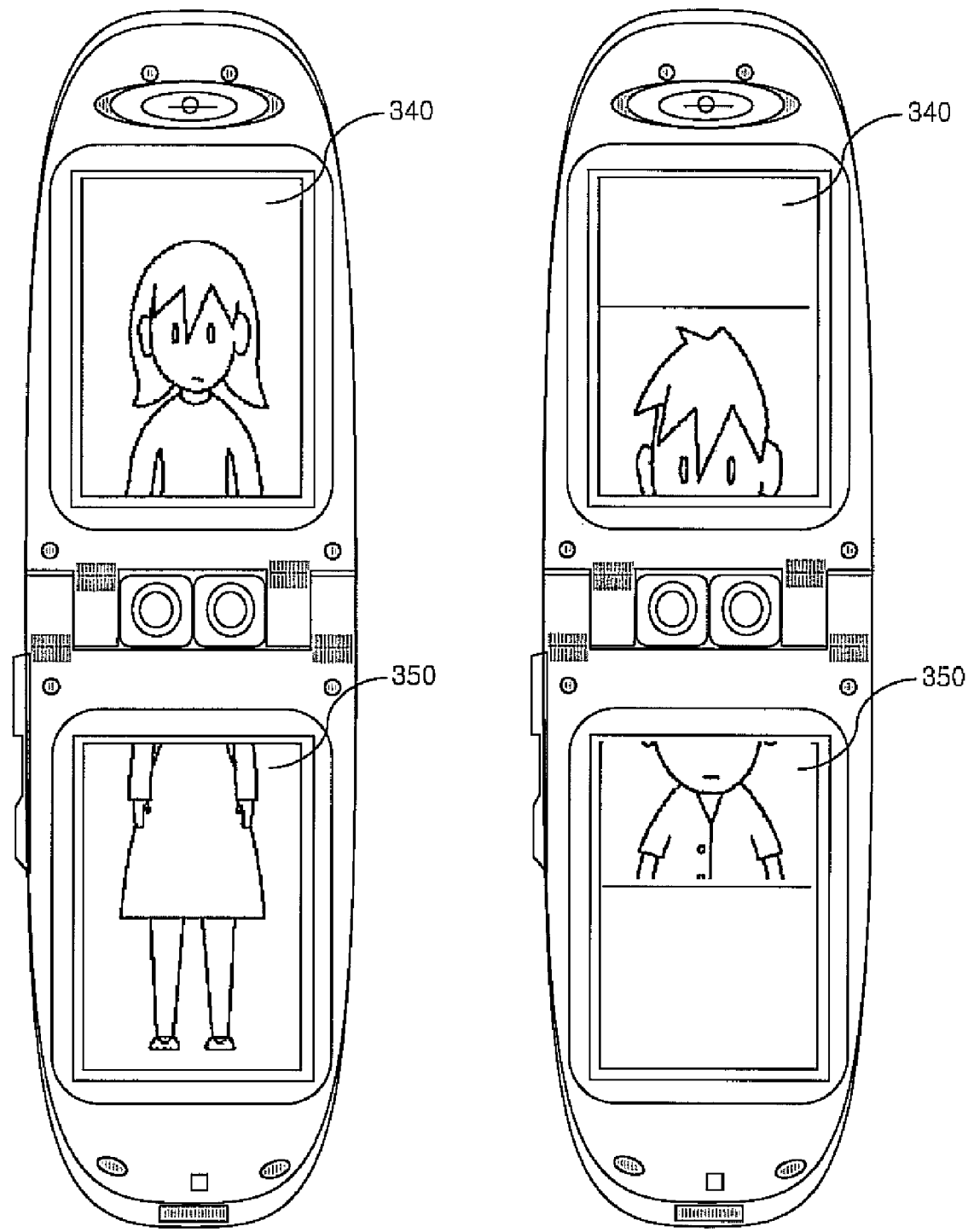

Referring to FIG. 8, the controller 370 may provide control such that the image received or the image captured by the first camera unit 320 or the second camera unit 330 can be divided to be partly displayed on the first 340 and second 350 display units, respectively.

Figure 9:
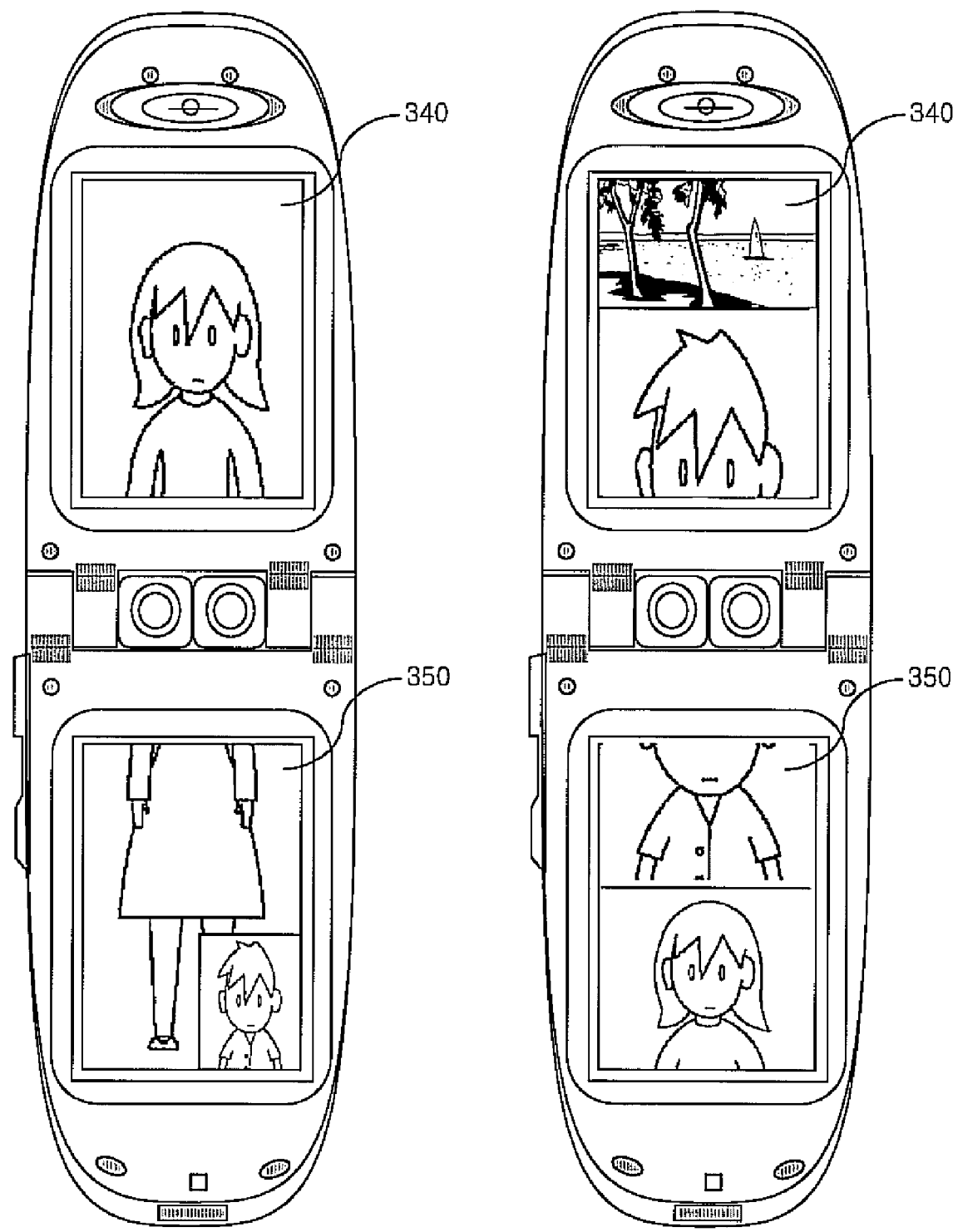
Figure 10:
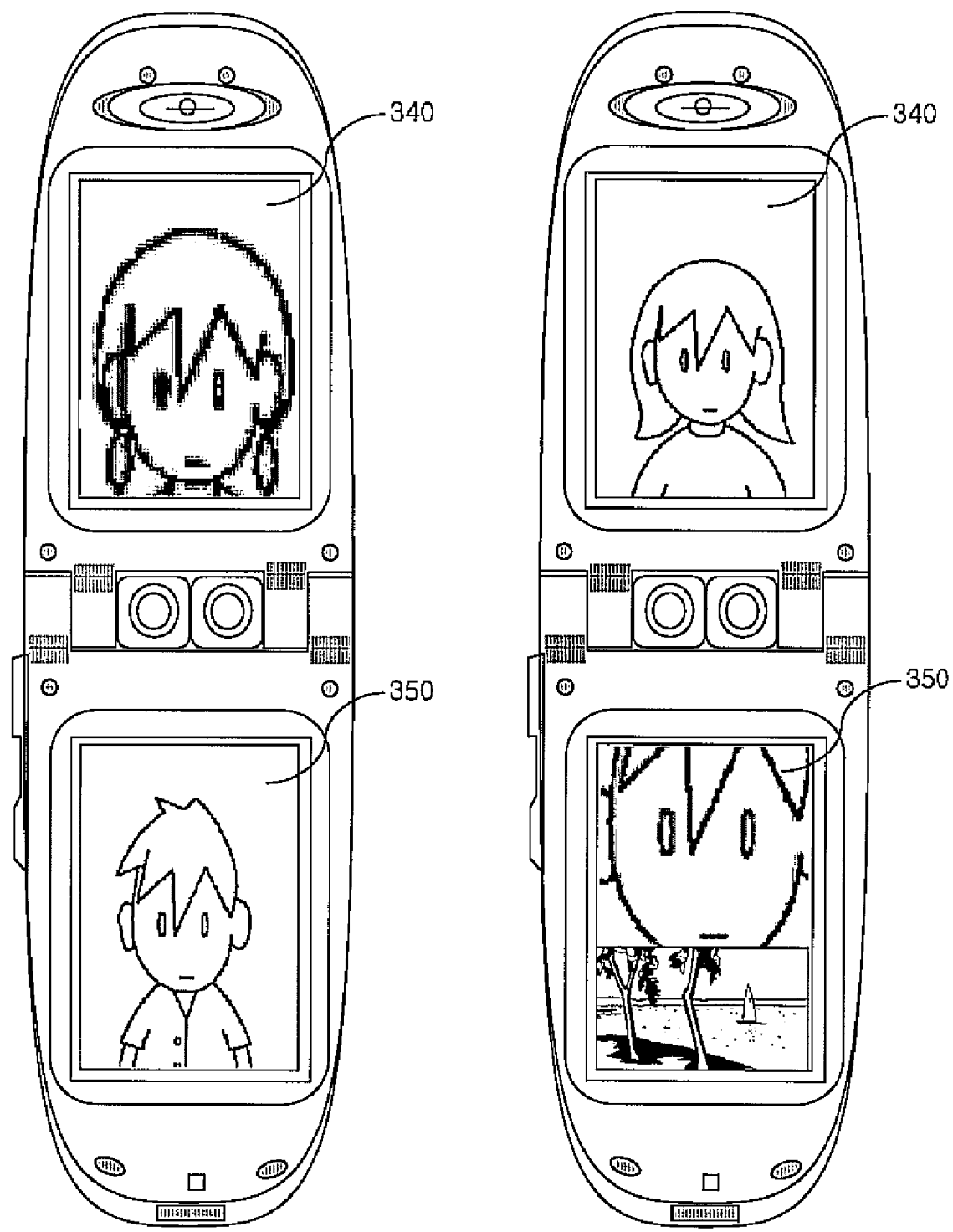

In one embodiment, as shown in FIG. 9, the controller 370 may provide control such that one of the images may be displayed divided on the two display units 340 and 350, for example. In another embodiment, as shown in FIG. 10, at least one of the images can be scaled up or down (i.e., magnified) through a zoom function (e.g., lens hardware or software) and displayed on one of the first and second display units 340 and 350. The other image may be displayed on the other display unit or the same display unit, depending by implementation.

The controller 370 may obtain the image captured via the first camera unit 320, or the second camera unit 330, or the image received from another party, and store such image as a still image or video in the storage unit 360, or may capture two or more images and combine them into a single image and store it. In one embodiment, the controller 370 may provide control such that at least two or more images are virtually combined through a preview function, and then the combined image is captured and stored in the storage unit 360.

Figure 11:
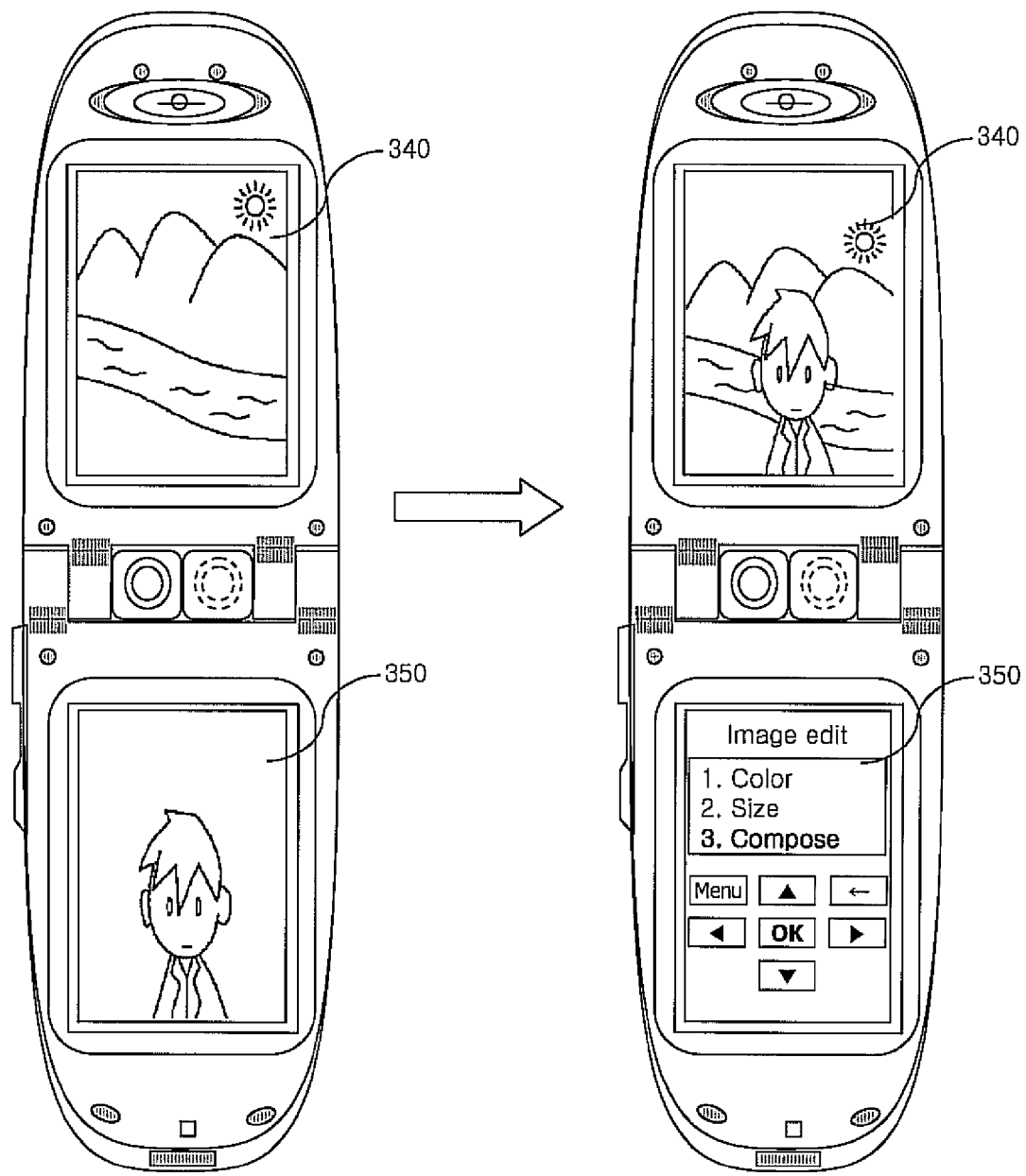

For example, as shown in FIG. 11, images are captured by the first and second camera units 320 and 330, respectively, and the respective images from the first camera unit 320 and the second camera unit 330 are obtained simultaneously or within a certain time interval, and then, combined into one image and stored.

Figure 12:
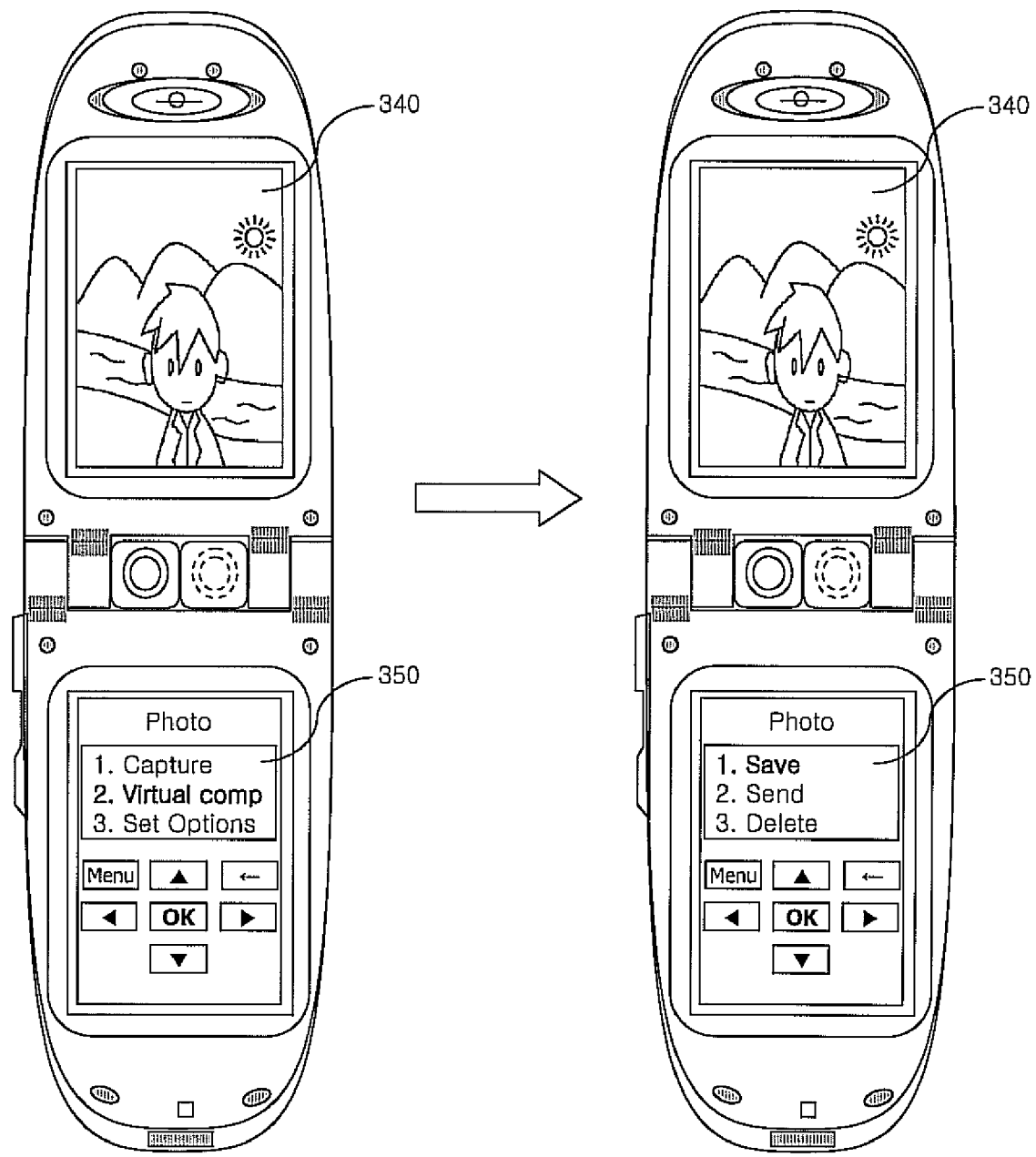

Referring to FIG. 12, the controller 370 may control the mobile terminal 300 such that at least two or more of the images are virtually combined through a preview function. The virtually combined image can be edited and stored. The controller 370 can transmit the stored image after having been captured, captured/combined or combined/captured to another subscriber (e.g., a mobile terminal of a different subscriber) designated by the user or a particular server through the transceiver 310. The particular server can be a telecommunications provider server or can be a general server of a service provider that provides a particular Internet service.

As mentioned above, at least one of the first and second display units 340 and 350 can be formed as a touch screen and perform a function of receiving touch sensitive inputs from the user. The mobile terminal 300 may include an input unit such as a keypad, a touch pad or a microphone, and may include an input terminal for receiving a signal by being connected with an external input unit such as a keyboard. The mobile terminal 300 may include an output unit such as a speaker, or may include an output terminal for outputting an image signal or a voice signal by being connected with an external display unit such as a television or a monitor.

The mobile terminal 300 may include other functional units having a supplementary function such as a storage medium insertion unit for allowing using of an external storage medium by inserting an external storage medium such as a memory card, a broadcast reception module, an MP3 module, an internet banking module, a local area wireless communication module, etc.

Figure 13:
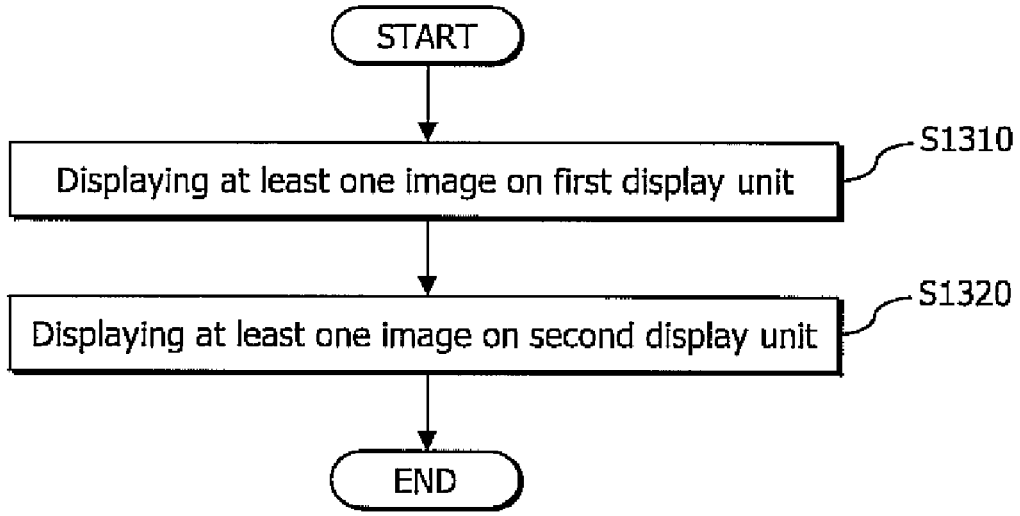
FIGS. 13 to 15 are flowcharts illustrating an exemplary method for image capturing and displaying according to one embodiment.
Figure 14:
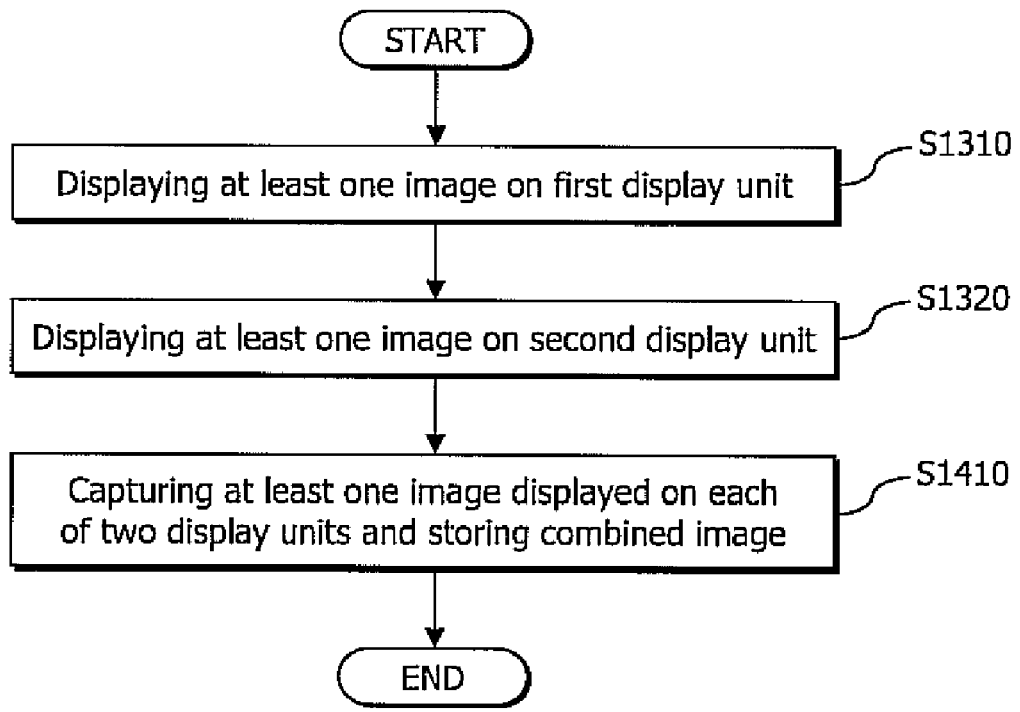
Figure 15:
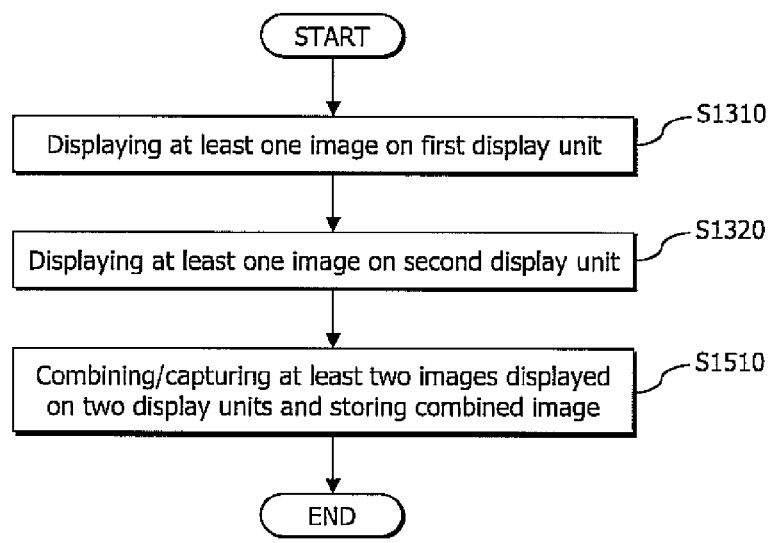

FIGS. 13 to 15 are flowcharts illustrating the exemplary processes of the image capturing and displaying method of the mobile terminal according to the present invention. With reference to FIG. 13, the image capturing and displaying method in the mobile terminal which has at least two display units and at least two camera units, may comprise displaying at least one image on the first display unit 340 (S1310); and displaying at least one image on the second display unit 350 (S1320).

Referring to FIGS. 4 to 10, at least one of the images captured by the first camera unit 320, or the second camera unit 330, or an image received from another party, or a previously stored image can be displayed on the first display unit 340, or on the second display unit 350. At least one of the first and second display units 340 and 350 can display an image for performing a function of the mobile terminal 300. In some embodiments, when two or more images are displayed on at least one of the first and second display units 340 and 350, the screen can be divided or split up (e.g., a PIP method) in order to display multiple images on each screen.

Referring to FIG. 14, the image capturing and displaying method of the mobile terminal may further comprise capturing and storing at least one of the images displayed on the first and second display units (S1410). The two or more captured images can be, for example, combined into one image and stored.

As shown in FIG. 15, the image capturing and displaying method of the mobile terminal 300 may further comprise combining at least two images displayed on the first and second display units 340, 350 and capturing and storing the images (S1510). In one embodiment, a virtual combining is performed on the screen through the preview function and then the virtually combined image is captured.

Although not shown, the image capturing and displaying method of the mobile terminal 300 may further transmit the stored image to a different subscriber or the particular server. As so far described, the mobile terminal and the image capturing and displaying method using the same according to the present invention have many advantages.

Preferably, at least one image can be captured and displayed in various forms through the two or more cameras or two or more display units. Two or more images can be displayed on one display unit, while an image for performing a function of the mobile terminal can be displayed on the other display unit, whereby the user can freely perform different operations (i.e., can perform multi-tasking) by using the mobile terminal 300 even while video telephony or image capturing is being performed. Moreover, two or more images can be combined to create a new image.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile terminal comprising:
   a transceiver unit for transmitting and receiving one or more images;
   first and second camera units for capturing a plurality of images;
   first and second display units for displaying the captured plurality of images, wherein the first and second display units are viewable together from a first viewing angle by a user;
   a storage unit for storing the captured plurality of images; and
   a controller for controlling the mobile terminal such that at least two of the captured plurality of images are each displayed on at least the first display unit or the second display unit, wherein the controller combines the at least two of the captured plurality of images into a single image and stores the combined single image in the storage unit,
   wherein the at least two of the captured plurality of images in the combined single image are consolidated into an image format such that the combined single image is displayed on at least the first display unit or the second display unit, wherein the user controls how different portions of the at least two of the captured plurality of images in the combined single image are each displayed on at least the first display unit or the second display unit.

2. The mobile terminal of claim 1, wherein at least one of the at least two of the captured plurality of images is displayed on the first display unit, and at least another one of the at least two of the captured plurality of images is displayed on the second display unit.

3. The mobile terminal of claim 1, wherein at least one of the at least two of the captured plurality of images is entirely displayed on the first display unit or the second display unit.

4. The mobile terminal of claim 1, wherein at least one of the at least two of the captured plurality of images is displayed partially on the first display unit and partially on the second display unit.

5. The mobile terminal of claim 1, wherein at least one of the received one or more images, at least one of the captured plurality of images, or at least one of the stored plurality of images is transmitted to a designated subscriber through the transceiver unit.

6. The mobile terminal of claim 1, wherein at least one of the received one or more images, at least one of the captured plurality of images, or at least one of the stored plurality of images is displayed on the first display unit and a functional image of a user interface is displayed on the second display unit.

7. The mobile terminal of claim 6, wherein the second display unit comprises a touch screen.

8. The mobile terminal of claim 1, wherein more than one image is displayed on the first display unit.

9. The mobile terminal of claim 8, wherein the first display unit is divided into a plurality of viewable sections.

10. The mobile terminal of claim 9, wherein the first display unit is divided according to a picture-in-picture method.

11. The mobile terminal of claim 9, wherein the first display unit is divided into a main screen and at least one sub-screen, wherein an image with a first level of importance is displayed on the main screen and an image with a second level of importance is displayed on said at least one sub-screen.

12. The mobile terminal of claim 11, wherein the images displayed on the main screen and the sub-screen can be switched.

13. The mobile terminal of claim 1, wherein the controller virtually combines the at least two of the captured plurality of images through a preview function.

14. A mobile communication terminal comprising:
   a first camera unit for capturing images;
   a second camera unit for capturing images;
   a storage unit for storing the captured images;
   a first display and a second display, wherein images displayed on both the first and the second displays are viewable from a first viewing angle;
   a user interface for allowing a user to select one or more images displayed on either of the first and second displays; and
   a controller for controlling the mobile terminal such that at least a portion of a first image captured by the first camera unit is displayed on the first display and at least a portion of a second image captured by the second camera unit is displayed on the second display, wherein the controller combines the first image and the second image into a single image and stores the combined single image in the storage unit,
   wherein the first image and the second image are consolidated into an image format such that the combined single image is displayed on at least the first display or the second display, wherein the user controls how different portions of the first image and the second image in the combined single image are each displayed on at least the first display or the second display.

15. The mobile communication terminal of claim 14, wherein a first portion of the first image is displayed on the first display and a second portion of the first image is displayed on the second display.

16. The mobile communication terminal of claim 14, wherein the second image is displayed on the first display.

17. The mobile communication terminal of claim 16, wherein the first and second images are displayed in a picture-in-picture format.

18. The mobile communication terminal of claim 16, wherein the first display is divided into a main screen and at least one sub-screen, wherein the first image is displayed in the main screen and the second image is displayed in said at least one sub-screen.

19. The mobile communication terminal of claim 14, wherein the first display comprises a touch screen comprising the user interface.

20. The mobile terminal of claim 1, wherein the controller is further for controlling the transceiver unit to transmit the combined single image.

21. The mobile terminal of claim 14, further comprising:
   a transceiver controllable by the controller to transmit the combined single image.

* * * * *